F. W. BURPEE.
CAN OPENER.
APPLICATION FILED NOV. 28, 1917.
1,289,645.
Patented Dec. 31, 1918.
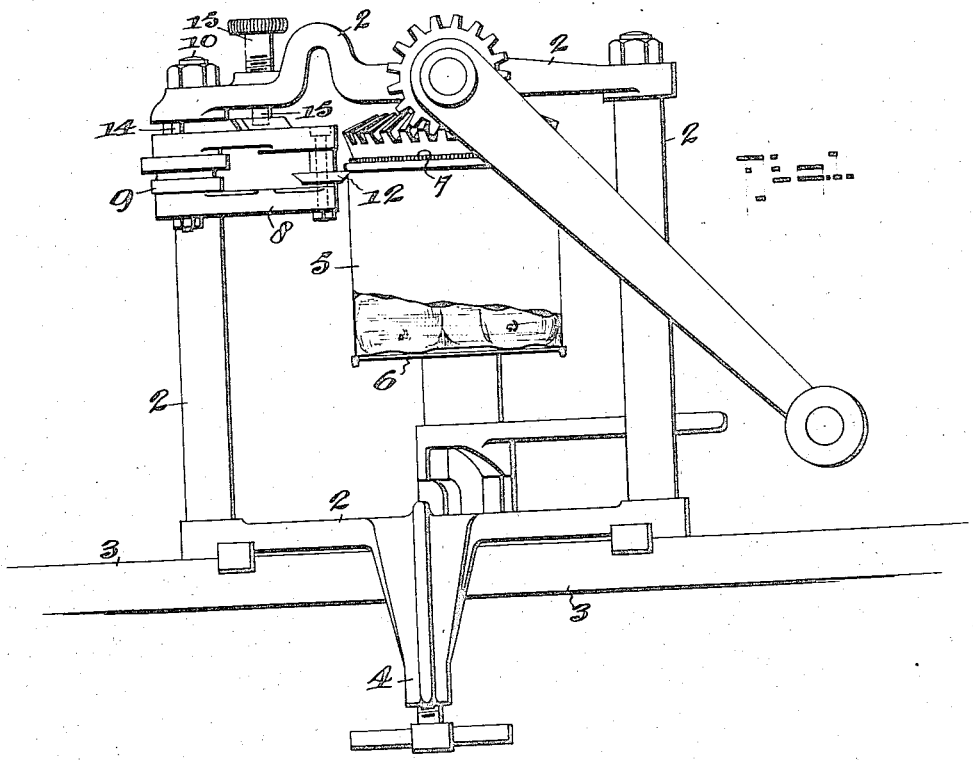
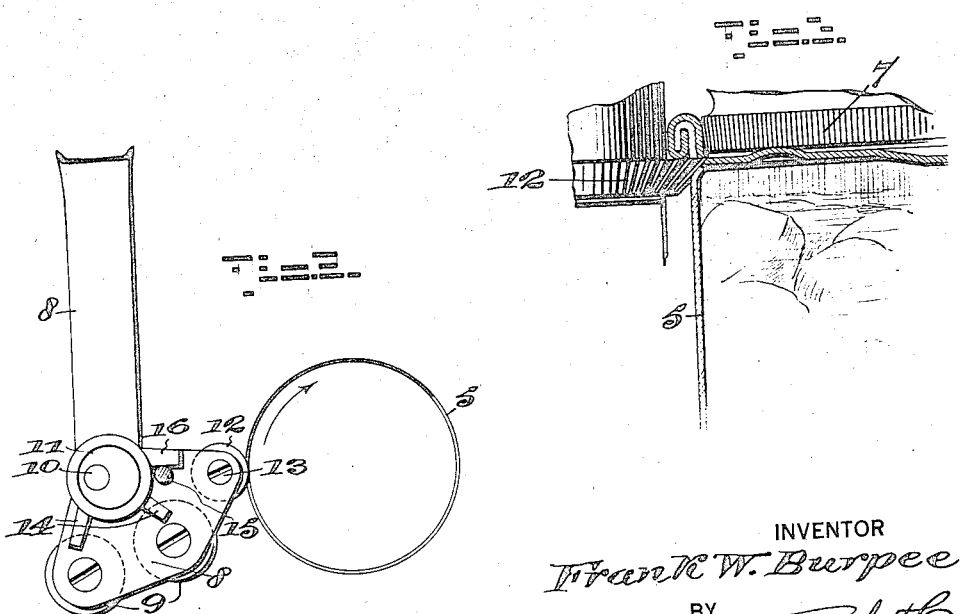
INVENTOR
Frank W. Burpee.
BY
Fred J. Dieterich & Co.
ATTORNEYS

UNITED STATES PATENT OFFICE.

FRANK W. BURPEE, OF SOUTH BELLINGHAM, WASHINGTON, ASSIGNOR TO BURPEE & LETSON, LIMITED, OF SOUTH BELLINGHAM, WASHINGTON.

CAN-OPENER.

1,289,645.  Specification of Letters Patent.  Patented Dec. 31, 1918.

Application filed November 28, 1917. Serial No. 204,423.

*To all whom it may concern:*

Be it known that I, FRANK W. BURPEE, a citizen of the Dominion of Canada, residing at South Bellingham, in the county of Whatcom and State of Washington, have invented certain new and useful Improvements in Can-Openers, of which the following is a specification.

This invention relates to a can opening device which is applied to a domestic can seaming machine as exemplified in Patent No. 1,230,273 granted to me on the 19th of June, 1917, and in the application for improvements on the same now pending before the office under Serial No. 154,583.

The can opener, which is the particular subject of this application, forms a part of the seaming machine before referred to and is designed to remove the end cover of a can by circumferentially cutting the cylinder of the body as close up to the cover seam as practicable, whereby the can body may be used for a second or third time in the same capacity.

The invention is particularly described in the following specification, reference being made to the drawings by which it is accompanied, in which:

Figure 1 is a front elevation of the can seaming machine complete to which this device is applied, a seaming roller being removed to afford an uninterrupted view of the cutting roller.

Fig. 2 is a plan of the lever which carries the seaming rollers of the machine showing the application to it of a cutting roller to cut the cover of a can from its body, and Fig. 3 is an enlarged detail section of the cover seam of a can body in the chuck of the machine with the cutting wheel applied.

In these drawings 2 represents the frame of the can seaming machine which is secured to a table or bench 3 by the clamp 4. The body of a can in the machine is represented by 5, which can has been lifted by the lower chuck plate 6 to press the recess of its upper cover onto the knurled head 7 of the driving chuck.

The lever 8 which carries the seaming rollers 9 is mounted on a pin 10 with an eccentric bushing 11 adapting it to be used on cans of different diameter.

To use the machine as a can opener one of the seaming rollers 9 may be removed and a shearing or cutting wheel 12 substituted for it, or, preferably, as shown in Fig. 2, the lever is adapted to receive in addition to the seaming rollers 9, a cutting wheel 12 mounted on a pin 13. The edge of this cutting wheel 12 is formed to a shearing angle rather than an acute cutting angle and is in a plane corresponding as closely as possible to the plane of the bottom of the can driving chuck 7, so that when pressed against the can body the wheel 12 will rotate and will circumferentially shear through the thickness of the cylinder of the can close up to the lower edge of the cover seam and against the radial resistance opposed by the can driving chuck 7 and the disk of the cover.

By this action the edge of the body where it is cut from the cover is not inwardly turned to any great extent and it is therefore easier to flange it outward in a subsequent operation in readiness for re-seaming a new cover on it.

As the seaming machine has a stop 15 on the upper bar of the frame 2 to limit the movement of each seaming roller at the line joining the fulcrum of the seaming roller lever and the axis of the can chuck, this stop will require to be removable when the cutting wheel 12 is mounted on a pin which is supplementary to those of the seaming rollers, in order that the cutting wheel may be brought into action when desired, and a further stop web 16 may be desirable to limit movement of the cutting wheel at the same line between the fulcrum of the seaming lever and the axis of the chuck.

In the drawing the upper side of the seaming roller lever adjacent its fulcrum bearing has upwardly projecting stop webs 14, and a stop pin 15 is threaded through the top bar of the frame 2 to project into the path of these webs and arrest movement of the lever at the desired limit for each seaming roller, and when the machine is required to be used as a can opener this stop pin 15 is screwed back to allow the stop web 14 to pass, and the cutting wheel 12 can then be moved into action on the cam body 14 to circumferentially shear the cover from it.

If it is found desirable to limit the movement of the cutting wheel 12 at the straight line between the lever fulcrum and the axis of the can holding chuck, as in the case of the seaming rollers, the same can be done by providing the lever with a stop web 16 for this purpose.

The success of this cover removing device is largely due to the application of the body cutting wheel immediately adjacent the lower edge of the seam, that is, substantially in the plane of the underside of the can driving chuck of the machine, as the driving chuck 7 strongly supports the body of the can against the radial pressure of the cutting wheel, enabling the metal to be cut with a minimum of inward bending of the cut edge. Before applying a new cover for re-seaming this edge is outwardly flanged to receive it in an appliance applicable to the same machine, which appliance is the subject of a separate patent application.

As stated in the preamble to this specification, cans, from which the covers have been removed circumferentially as described, can be re-covered and are thus available for further use. When the longitudinal seam of the can body is lock-jointed, the lock joint terminates a short distance from each end to avoid a multiple thickness of metal at the cover seams; and this circumstance enables each end to be re-flanged after cutting without bringing the lock joint into the cover seam. Where the longitudinal seams are not lock-jointed the ends of the cans may be re-covered as long as the body of the can is in fit condition for further use.

As the hand seaming machine has been devised largely for domestic use, the advantage of being able to use the can a second or third time will enable a considerable economy to be exercised in the domestic canning of goods.

Having now particularly described my invention, I hereby declare that what I claim as new and desire to be protected in by Letters Patent, is:

1. A can opener, comprising the combination with a rotatable can holding chuck, the driving head of which is adapted to fit the recess of the can cover, of a cutting wheel rotatably mounted in the shorter end of a lever mounted in the frame of the machine to move the cutting edge of the wheel into contact with the can body in the plane of the bottom edge of the can driving chuck.

2. A can opener, comprising the combination with a can holding chuck rotatably mounted in a suitable frame, of means for circumferentially cutting the body of a can adjacent the cover seam, said means comprising a cutting wheel rotatably mounted in the shorter end of a lever pivotally mounted in the frame of the machine to move the cutting edge of the wheel into contact with the can body, and means for varying the distance of the center of the lever fulcrum from the axis of the can holding chuck.

3. A can opener, comprising the combination with a can holding chuck rotatably mounted in a suitable frame, a lever having a circular shearing wheel rotatably mounted in its shorter arm, and a stop limiting movement of the axis of the cutting wheel at a straight line joining the fulcrum of the lever with the axis of the can chuck.

4. A can opener, comprising the combination with a can holding chuck rotatably mounted in a suitable frame, and a lever having a circular shearing wheel rotatably mounted in its shorter arm, and a removable stop limiting movement of the axis of the cutting wheel at a straight line joining the fulcrum of the lever with the axis of the can chuck.

In testimony whereof I affix my signature.

FRANK W. BURPEE.